United States Patent
Hévizi

(10) Patent No.: US 12,057,893 B2
(45) Date of Patent: Aug. 6, 2024

(54) TECHNIQUE FOR DETERMINING NEIGHBOURING RADIO RESOURCES BASED ON SIGNAL STRENGTH MEASUREMENTS

(71) Applicant: Telefonaktiebolaget LM Ericsson (publ), Stockholm (SE)

(72) Inventor: László Hévizi, Piliscsaba (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 361 days.

(21) Appl. No.: 16/972,463

(22) PCT Filed: Jun. 5, 2018

(86) PCT No.: PCT/EP2018/064776
§ 371 (c)(1),
(2) Date: Dec. 4, 2020

(87) PCT Pub. No.: WO2019/233566
PCT Pub. Date: Dec. 12, 2019

(65) Prior Publication Data
US 2021/0234621 A1    Jul. 29, 2021

(51) Int. Cl.
*G01S 5/02* (2010.01)
*H04B 17/318* (2015.01)
(Continued)

(52) U.S. Cl.
CPC ........ *H04B 17/318* (2015.01); *G01S 5/02523* (2020.05); *H04W 24/02* (2013.01); *H04W 24/10* (2013.01); *H04W 48/16* (2013.01)

(58) Field of Classification Search
CPC .... H04B 17/318; H04W 24/02; H04W 48/18; H04W 36/0022; H04W 36/14;
(Continued)

(56) References Cited

U.S. PATENT DOCUMENTS 9,479,950 B2 * 10/2016 Axmon ............. H04W 36/0094
2013/0252631 A1 * 9/2013 Alizadeh-Shabdiz .....................
H04W 4/025
455/456.1

(Continued)

OTHER PUBLICATIONS

Torres-Sospedra Joaquin et al, Comprehensive analysis of distance and similarity measures for Wi-Fi fingerprinting indoor positioning systems, Expert Systems With Applications, Oxford, GB, vol. 42, No. 23, Aug. 12, 2015 (Aug. 22, 2015), p. 9263-9278, XP029278339 (Year: 2015).*

(Continued)

*Primary Examiner* — Edan Orgad
*Assistant Examiner* — Vanneilian Lalchinthang
(74) *Attorney, Agent, or Firm* — Rothwell, Figg, Ernst & Manbeck, P.C.

(57) ABSTRACT

A technique for determining a list of neighbouring radio resources from signal strength measurements taken by mobile terminals is presented. Two or more signal strength measurements taken by the same mobile terminal at substantially the same time are grouped to a data set that associates, for each of two or more different radio resources of a given radio resource type, a measured signal strength with an identifier of the measured radio resource. An apparatus implementation of the technique presented herein is configured to analyze, using a similarity metric, similarity of a plurality of data sets, cluster the data sets, or information derived therefrom, based on data sets similarity so as to obtain multiple clusters representative of different radio locations and to determine, from each cluster, a radio resource set that defines a list of neighbouring radio resources for the radio location represented by that cluster.

9 Claims, 12 Drawing Sheets

(51) Int. Cl.
*H04W 24/02* (2009.01)
*H04W 24/10* (2009.01)
*H04W 48/16* (2009.01)
*H04W 48/18* (2009.01)

(58) Field of Classification Search
CPC ..... H04W 24/10; H04W 48/16; H04W 48/08; H04W 76/10; H04W 84/12; G01S 5/0252; G01S 5/0205; G01S 5/02523; G01S 5/02521
USPC ......................................................... 370/252
See application file for complete search history.

(56) References Cited

U.S. PATENT DOCUMENTS

| | | | | |
|---|---|---|---|---|
| 2015/0105086 | A1* | 4/2015 | Thiel | H04W 64/00 455/446 |
| 2016/0337960 | A1* | 11/2016 | Nagasaka | H04W 36/30 |
| 2017/0160375 | A1* | 6/2017 | Syrjärinne | G01S 5/02521 |
| 2018/0103136 | A1* | 4/2018 | Holm | H04M 7/0036 |
| 2018/0204111 | A1* | 7/2018 | Zadeh | G06V 10/764 |
| 2018/0242183 | A1* | 8/2018 | Bergström | H04L 5/001 |
| 2018/0253529 | A1* | 9/2018 | Zhao | G16B 40/20 |
| 2020/0229206 | A1* | 7/2020 | Badic | H04W 40/24 |

OTHER PUBLICATIONS

International Search Report and the Written Opinion of the International Searching Authority, issued in corresponding International Application No. PCT/EP2018/064776, dated Feb. 11, 2019, 16 pages.
Torres-Sospedra Joaquín et al, "Comprehensive analysis of distance and similarity measures for Wi-Fi fingerprinting indoor positioning systems", Expert Systems With Applications, Oxford, GB, vol. 42, No. 23, Aug. 22, 2015 (Aug. 22, 2015), p. 9263-9278, XP029278339.
Xiaomei Liang et al, "Fingerprint-based location positoning using improved KNN", Network Infrastructure and Digital Content (IC-NIDC), 2012 3rd IEEE International Conference On, IEEE, Sep. 21, 2012 (Sep. 21, 2012), p. 57-61, XP032314536.
Han Yanan et al, "Performance evaluation of simplified matching algorithms for RF fingerprinting in LTE network", Sep. 25, 2015 (Sep. 25, 2015), p. 24-28, XP032864290.
3GPP TS 36.331 V15.1.0 (Mar. 2018), 3rd Generation Partnership Project; Technical Specification Group Radio Access Network; Evolved Universal Terrestrial Radio Access (E-UTRA); Radio Resource Control (RRC); Protocol specification (Release 15), Mar. 2018, 786 pages.
3GPP TS 36.133 V15.2.0 (Mar. 2018), 3rd Generation Partnership Project; Technical Specification Group Radio Access Network; Evolved Universal Terrestrial Radio Access (E-UTRA); Requirements for support of radio resource management (Release 15), Mar. 2018, 77 pages.

* cited by examiner

TECHNIQUE FOR DETERMINING NEIGHBOURING RADIO RESOURCES BASED ON SIGNAL STRENGTH MEASUREMENTS

CROSS REFERENCE TO RELATED APPLICATION(S)

This application is a 35 U.S.C. § 371 National Phase Entry Application from PCT/EP2018/064776, filed Jun. 5, 2018, designating the United States, the disclosure of which is incorporated herein by reference in its entirety.

TECHNICAL FIELD

The present disclosure generally relates to mobile communication networks. In particular, a technique for determining neighbouring radio resources based on signal strength measurements performed by mobile terminals is presented. The technique may be implemented in the form of apparatuses, methods, computer programs and cloud computing systems.

BACKGROUND

Mobile communication networks reach out for new spectrum and continuously improve the underlying radio access technologies (RATs). To enhance user experience (e.g., in terms of voice quality or download speed) or network conditions (e.g., to reduce interference), mobile terminals aim to connect to the best locally available radio resources. For this reason, also in a non-mobile state, mobile terminals will occasionally change radio resources (e.g., RATs or radio cells). For evaluation of whether or not a particular mobile terminal can benefit from such a change, it initially needs to spend time and energy for discovery of available radio resources.

When, for example, a mobile terminal is in active mode and connects to one of the cellular RATs standardized by the 3rd Generation Partnership Project (3GPP), then it keeps on surveying the available cells, possibly at different RATs and frequency carriers, which may have been selected for it by the network side. To this end, a primary serving base station may individually configure measurement gaps for the mobile terminal. Such gaps can be periodic or occasional. The mobile terminal halts all communications with a radio access network during the measurement gaps and reports its measurement results either periodically or on fulfilment of some pre-defined condition. In this regard, the radio resource control (RRC) specifications for the enhanced UMTS terrestrial radio access network (E-UTRAN) can be cited as references (see, e.g., 3GPP TS 36.331 V15.1.0 (2018-3), Chapter 5.5 or 3GPP TS 133 V15.2.0 (2018-3), Chapter 8.1).

Usually, mobile terminals are not able to perform simultaneous inter-RAT and inter-frequency measurements due to lack of hardware capabilities (e.g., a certain number of transceiver units and radio frequency front-ends would be required to this end). Thus, inter-RAT measurements pose a burden both on the mobile terminals and the network side, regardless of which RATs serve the mobile terminals.

Prior art has extensively dealt with solutions that aim to help and improve the inter-RAT and inter-frequency measurements.

For example, a solution called automatic neighbourhood relations (ANR) is a network side technique by which the serving base station limits the number of frequency carriers, RATs, base stations or radio cells that a mobile terminal should scan for when attached to a specific cell. ANR automatically builds a database for the multi-RAT network. This database contains a list of potential neighbour candidates for each base station, cell or access point of a particular RAT.

Another solution within the mobility robustness optimization (MRO) framework aims to find automatically the cell-specific parameters which control the inter-RAT and inter-frequency measurements and handovers.

There are also alternative solutions such as in U.S. Pat. No. 9,479,950 B2, which allow the mobile terminals to detect carriers or cells quickly. As such, the measurement gaps that mobile terminals need to spend on resource discovery can be shorter.

The variety of RATs and the number of frequency bands and frequency carriers available for mobile services are increasing. Hence, both mobile terminals and the network side can benefit if the mobile terminals perform inter-RAT and inter-frequency measurements only where and when needed. Although ANR is able to provide a cell-specific filtered list of potential neighbours to be monitored by mobile terminals, it has been found that this list is not location-specific and neither can specify the periods when certain neighbours are not worthwhile to monitor.

SUMMARY

Accordingly, there is a need for a technique that avoids one or more drawbacks of the prior art solutions, or other drawbacks. For example, there is room to optimize measurements performed by mobile terminals by instructing them more precisely when and what to measure if needed, and when not to measure if not needed.

According to a first aspect, an apparatus for determining a list of neighbouring radio resources from signal strength measurements taken by mobile terminals is provided, wherein two or more signal strength measurements taken by the same mobile terminal at substantially the same time are grouped to a data set that associates, for each of two or more different radio resources of a given radio resource type, a measured signal strength with an identifier of the measured radio resource. The apparatus is configured to analyse, using a similarity metric, similarity of a plurality of data sets, to cluster the data sets, or information derived therefrom, based on data set similarity so as to obtain multiple clusters representative of different radio locations, and to determine, from each cluster, a radio resource set that defines a list of neighbouring radio resources for the radio location represented by that cluster.

The radio resource type may include at least one of radio cell, frequency carrier, frequency band, antenna beam and RAT. Each individual radio resource of a given radio resource type may be associated with an at least locally unique identifier. As such, each radio cell may be associated with a radio cell identifier, each frequency carrier may be associated with a frequency carrier identifier, and so on.

In one variant, the radio resource type is a radio cell (or simply "cell"). In such a case, the radio resource set is a cell set and the list of neighbouring radio resources may comprise the cell identifiers of the cells included in that cell set. In other variants, the radio resource type could be frequency carrier (or frequency band, antenna beam, RAT, and so on) and the associated radio resource set is a frequency carrier set (or frequency band set, antenna beam set, RAT set, and so on).

In certain scenarios, a particular signal strength measurement may be associated with two or more radio resources of different radio resource types. The corresponding resource types may include two or more of radio cell, frequency carrier, frequency band, antenna beam and RAT. For example, if a first radio resource type is cell, at least one additional radio resource type may be at least one of frequency carrier, frequency band, antenna beam, and RAT. In such a case, at least some of the data sets may associate a measured signal strength with an identifier of the measured cell and an identifier of the at least one additional measured radio resource of the at least one additional radio resource type. If, for example, the signal strength is measured for a given cell operated in accordance with a given RAT, the data set may associate the measured signal strength with an identifier of that cell and an identifier of that RAT (e.g., as a tuple (measured signal strength; cell identifier; RAT identifier), wherein the data set may contain multiple such tuples in regard to different cells and/or RATs).

In a similar manner, when signal strength measurements are taken in regard to the radio resource type "cell" and at least one additional radio resource type, the resulting list of neighbouring radio resources may comprise the cell identifiers of the cells included in the resulting cell set as well as the associated radio resource identifiers for the at least one additional radio resource type. In other variants, the radio resource identifiers for the at least additional radio resource type are omitted from the list of neighbouring radio resources. In such a case, the list will only include cell identifiers of neighbouring cells.

The radio resource set underlying the list of neighbouring radio resources can be determined in various ways. As an example, the radio resource set for a given cluster can be determined based on a number of occurrences of an individual radio resource identifier in that cluster. In such a case, the radio resource set may be determined to include the one or more radio resource identifiers having the highest number of occurrences in that cluster. Alternatively, or in addition, the radio resource set for a given cluster may be determined based on measured signal strengths associated with the radio resource identifiers in that cluster. In such a case, the radio resource set may be determined to include the one or more radio resource identifiers associated with the highest signal strengths in that cluster.

As explained above, similarity of the plurality of data sets may be analysed using a similarity metric. In this regard, a pairwise comparison of the plurality of data sets may be performed. The similarity metric may be configured to evaluate similarity of two data sets by comparing signal strengths measured for a coinciding set of two or more radio resource identifiers included in each data set and pertaining to the same radio resource type. It should be noted in this regard that the data sets to be compared need not necessarily contain the same number of measured signal strengths nor need the measured signal strengths in the data sets to be compared relate to exactly the same radio resources (i.e., exactly the same radio resource identifiers). Pairwise similarity of data sets could still be assessed in case the two data sets to be compared contain different numbers of signal strength measurements or when some of the signal strength measurements in the two data sets are performed for non-coinciding radio resource identifiers.

The clustering can be implemented in various ways. The clustering may be performed using a clustering algorithm (e.g., one of a K-means algorithm, a K-medoid algorithm and an Affinity Propagation algorithm).

The apparatus may be configured to operate in various phases. As such, the apparatus may initially perform the analysis, clustering and determining operations in a training phase. Then, in an operational phase following the training phase, the clusters may be updated as new data sets are obtained in real time.

According to a second aspect, an apparatus for selecting a list of neighbouring radio resources for a mobile terminal is provided, wherein the list includes a radio resource set and is associated with a data set cluster representative of a radio location and comprising multiple data sets, each data set grouping signal strength measurements taken by the same mobile terminal at substantially the same time and associating, for each of two or more different radio resources of a given radio resource type, a measured signal strength with an identifier of the measured radio resource. The apparatus is configured to obtain at least one signal strength measured by the mobile terminal for at least one radio resource, to match the at least one obtained signal strength and an identifier of the at least one measured radio resource with a plurality of clusters to determine a matching cluster, and to select a list of neighbouring radio resources that is associated with the matching cluster.

The apparatus according to the second aspect is in one variant configured to obtain and match a data set comprising two or more signal strengths measured by the mobile terminal for each of two or more radio resources at substantially the same time. The two or more radio resources may be of the same radio resource type or of different radio resource types. The obtaining and matching steps may essentially be performed in real time in regard to the actual measurements having been performed by the mobile terminal so as to determine a dedicated measurement configuration for that mobile terminal. Moreover, a measurement by the mobile terminal of at least one radio resource included in the selected list of neighbouring radio resources may be triggered. The obtaining, matching, selecting and, optionally, triggering operations may all be performed in real time.

Assuming that the mobile terminal is currently utilizing a first radio resource of a given radio resource type (e.g., a first RAT, a first frequency carrier, a first frequency band or a first antenna beam), the measurement may be triggered for a second radio resource of the given radio resource type. The second radio resource is different from the first radio resource. As such, the measurement can be an inter-RAT, inter-frequency carrier, inter-frequency band or inter-antenna beam measurement.

When the radio resource type is cell, the triggered measurement may relate to a cell search. When the radio resource type is cell, the apparatus according to the second aspect may further be configured to trigger a measurement re-configuration for the mobile terminal to avoid cell measurements where there is no cell coverage. The cell measurements may have been instructed by the network previously and may need to be re-configured in view of the fact that the selected list of neighbouring radio resources (that contains the cell identities of neighbouring cells) is found to not include the cell identifier of the cell previously instructed to be measured.

In some implementations of the second apparatus aspect, the radio resource type is cell and the list of neighbouring radio resources further includes one or more radio resource identifiers pertaining to one or more additional radio resource types. As an example, the one or more additional radio resource types may include one or more of frequency carrier, frequency band, antenna beam and radio access technology. In such a scenario, the triggered measurement may relate to the radio resources identified by a specific combination of radio resource identifiers as defined in the list, for example by one specific list entry (e.g., a specific cell and a specific RAT as identified by a cell identifier and an associated RAT identifier in a specific list entry).

According to a third aspect, a local apparatus for reporting signal strength measurements taken by one or more mobile terminals is provided. The apparatus is configured to obtain two or more signal strength measurements taken by the same mobile terminal at substantially the same time in a data set that associates, for each of two or more different radio resources of a given radio resource type, a measured signal strength with an identifier of the measured radio resource. The apparatus is further configured to report the data set to a central apparatus configured to receive data sets from multiple local apparatuses.

The local apparatus may receive the two or more signal strength measurements in a batch (e.g., in a single data set) from the mobile terminal. In another variant, the two or more signal strength measurements taken by the same mobile terminal are received individually and grouped by the local apparatus into the data set.

The local apparatus may be configured as a radio access network node. As an example, the local apparatus may be a base station. In other variants, one or more of the operations of the local apparatus may be performed by a mobile terminal itself (e.g., the local apparatus may be integrated into the mobile terminal taking the two or more signal strength measurements) or by a core network node (e.g., by a dedicated analytics node in the core network).

The local apparatus may be configured to assist the central apparatus in generation or selection of one or more lists of neighbouring radio resources based on the reported data set. For example, the data set reporting operation performed by the local apparatus may target at enabling the central apparatus to generate a plurality of lists of neighbouring radio resources based on multiple reported data sets or to select a list from that plurality of lists based on the reported data set.

In some variants, the local apparatus may receive a list of neighbouring radio resources in response to the reported data set. The list may have been selected by the central apparatus. The local apparatus may be configured to then trigger (e.g., via RRC) a measurement by the mobile terminal for at least one radio resource included in the received list of neighbouring radio resources. As explained above, the mobile terminal may currently be utilizing a first radio resource of a given radio resource type and the measurement may be triggered for a second radio resource of the given radio resource type that is different from the first radio resource. The triggered measurement may relate to a cell search in case the radio resourced type is cell.

In a variant in which the radio resource type is cell, the apparatus may be configured to trigger (e.g., via RRC) a measurement re-configuration for the mobile terminal to avoid cell measurements where there is no cell coverage. The measurement re-configuration may be triggered responsive to an evaluation of the list of neighbouring radio resources that was received in response to the reported data set.

Also provided is a method for determining a list of neighbouring radio resources from signal strength measurements taken by mobile terminals, wherein two or more signal strength measurements taken by the same mobile terminal at substantially the same time are grouped to a data set that associates, for each of two or more different radio resources of a given radio resource type, a measured signal strength with an identifier of the measured radio resource.

The method comprises analysing, using a similarity metric, similarity of a plurality of data sets, clustering the data sets, or information derived therefrom, based on data set similarity so as to obtain multiple clusters representative of different radio locations, and determining, from each cluster, a radio resource set that defines a list of neighbouring radio resources for the radio location represented by that cluster.

The method may be performed by the apparatus according to the first aspect as described herein.

Also provided is a method for selecting a list of neighbouring radio resources for a mobile terminal, the list including a radio resource set and being associated with a data set cluster representative of a radio location and comprising multiple data sets, each data set grouping signal strength measurements taken by the same mobile terminal at substantially the same time and associating, for each of two or more different radio resources of a given radio resource type, a measured signal strength with an identifier of the measured radio resource. The method comprises obtaining at least one signal strength measured by the mobile terminal for at least one radio resource, matching the at least one obtained signal strength and identifier of the at least one measured radio resource with a plurality of clusters to determine a matching cluster, and selecting a list of neighbouring radio resources that is associated with the matching data cluster.

The method may be performed by the apparatus of the second aspect as described herein.

Also provided is a method for reporting signal strength measurements taken by one or more mobile terminals. The method is performed by a local apparatus and comprises obtaining two or more signal strength measurements taken by the same mobile terminal at substantially the same time in a data set that associates, for each of two or more different radio resources of a given radio resource type, a measured signal strength with an identifier of the measured radio resource. The method further comprises reporting the data set to a central apparatus configured to receive data sets from multiple local apparatuses.

The method may be performed by the local apparatus according to the third aspect described herein.

Also provided is a computer program product comprising program code portions for performing the steps of any of the method aspects presented herein when executed by one or more processors. The computer program product may be stored a computer-readable recording medium. The computer program product may also be provided for download via a network connection.

Also presented is a cloud computing system configured to perform any of the method aspects presented herein. The cloud computing system may comprise distributed cloud computing resources that jointly perform the method aspects presented herein.

BRIEF DESCRIPTION OF THE DRAWINGS

Further aspects, details and advantages of the present disclosure will become apparent from the detailed description of exemplary embodiments below and from the drawings, wherein:

FIGS. 6A and 6B illustrate data set embodiments of the present disclosure;

DETAILED DESCRIPTION

Figure 1:
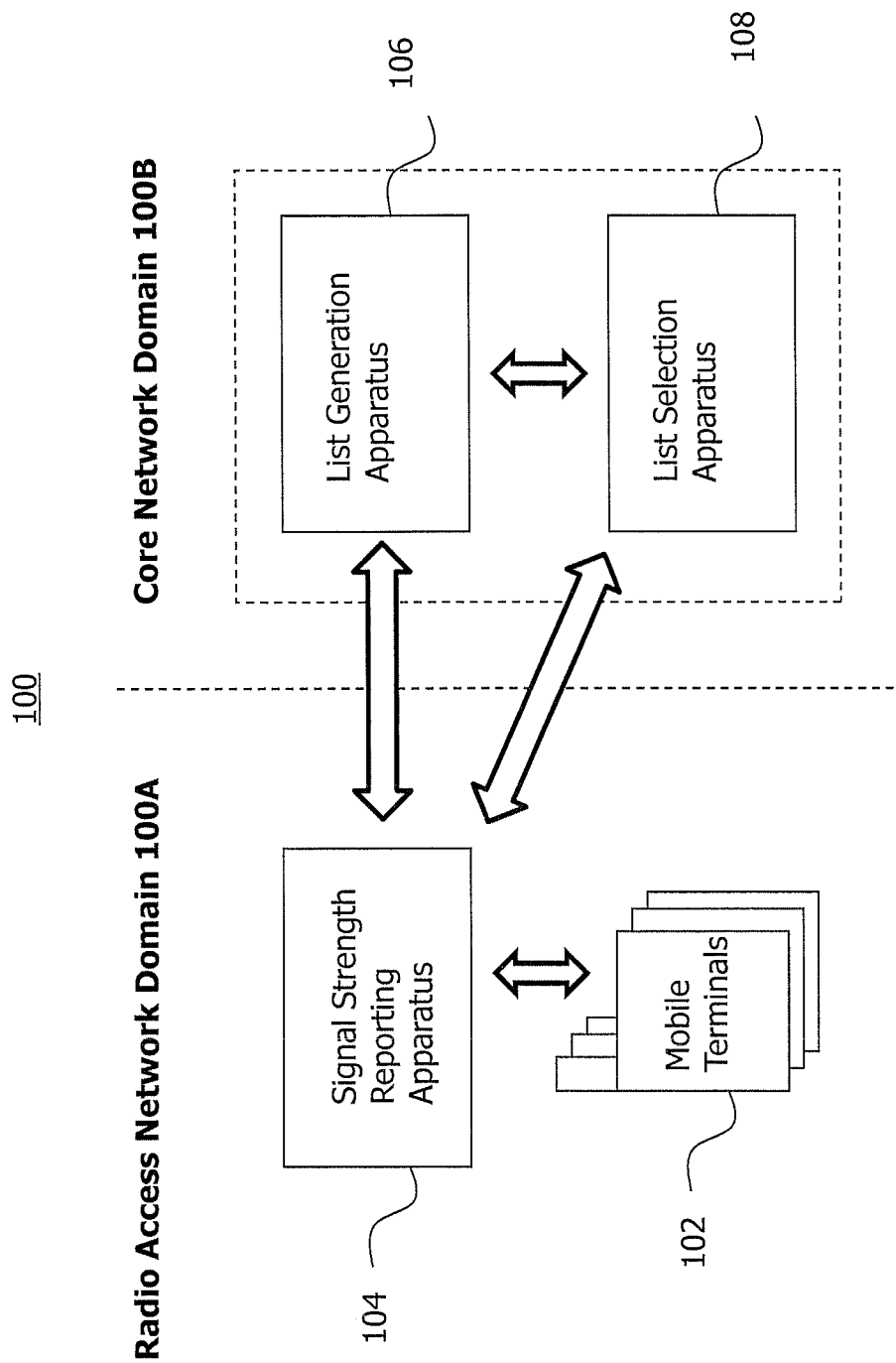
FIG. 1 illustrates a network embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on specific radio resource types such as radio cells, frequency carriers, frequency bands and antenna beams, the present disclosure can also be implemented in connection with other radio resource types. Moreover, while certain aspects in the following description will exemplarily be described in connection with cellular networks, particularly as standardized by 3GPP, the present disclosure is not restricted to any specific wireless access type.

Those skilled in the art will further appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 illustrates an embodiment of a mobile communication network 100 configured to implement an optimized strategy for signal strength measurements. As shown in FIG. 1, the network 100 comprises at least one radio access network domain in 100A as well as a core network domain 100B. The radio access network domain 100A comprises multiple mobile terminals 102 each configured to perform signal strength measurements. The radio access network domain 100A further comprises a signal strength reporting apparatus 104 configured to receive the signals strength measurements taken by one or more (or all of) the mobile terminals 102 and to report these measurements towards the core network domain 100B. In some implementations, the signal strength reporting apparatus 104 may be configured within a radio access network, such as a base station (e.g., in a serving base station). In other implementations (not shown), the signal strength reporting apparatus 104 may be integrated in an individual mobile terminal 102.

The core network domain 100B comprises a list generation apparatus 106 and a list selection apparatus 108. It should be noted that the list generation apparatus 106 and the list selection apparatus 108 could be combined in a single apparatus, as illustrated by the dashed box in FIG. 1. It should further be noted that while the list generation apparatus 106 and the list selection apparatus 108 are illustrated in FIG. 1 to be implemented within the core network domain 100B (e.g., as a dedicated analytics resource deep in the core network or by an edge computing resource of the core network), one or both of the list generation apparatus 106 and the list selection apparatus 108 could also be located outside the core network domain 100B (e.g., in the radio access network domain 100A or configured to communicate through the core network domain 100B with the radio access network domain 100A).

In the embodiment illustrated in FIG. 1, the list generation apparatus 106 and the list selection apparatus 108 are configured to communicate with each other and with the signal strength reporting apparatus 104. When implemented in the radio access network domain 100A, one or both of the apparatuses 106 and 108 may be configured to communicate with the mobile terminals 102 directly.

The mobile terminals 102 are typically configured to implement one or more dedicated signal strength measurement approaches. A first measurement approach is performed continuously and the measurements are sent to the network (e.g., to the signal strength reporting apparatus 104) only if pre-defined conditions are fulfilled. A second measurement approach is performed such that measurements are usually triggered by the network. As a third measurement approach, periodic measurement and reporting can be configured. As an example, the first measurement approach is applied to perform intra-RAT and intra-frequency carrier measurements on neighbour cells, while the second measurement approach is performed to acquire inter-RAT and inter-frequency carrier measurements. In the implementation illustrated in FIG. 1, it is assumed that the signal strength measurements are sent by the mobile terminals 102 to the local signal strength reporting apparatus 104 and channeled from there in the form of data sets to the central list generation apparatus 106.

Figure 2B:
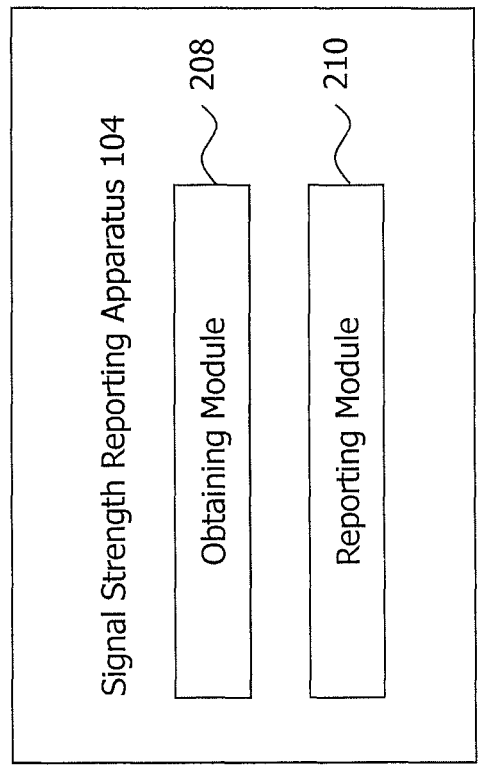
FIGS. 2A and 2B illustrate embodiments of a signal strength reporting apparatus according to the present disclosure.
Figure 2A:
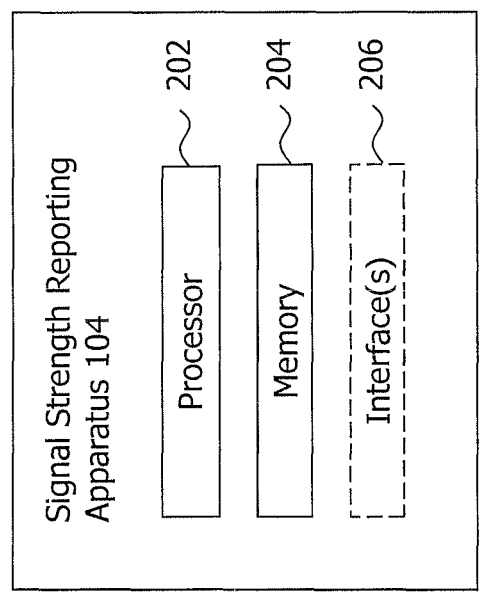

FIGS. 2A and 2B illustrate two embodiments of the signal strength reporting apparatus 104 of FIG. 1. In the embodiment illustrated in FIG. 2A, the signal strength reporting apparatus 104 comprises a processor 202 and a memory 204 coupled to the processor 202. Optionally, the signal strength reporting apparatus 104 comprises one or more interfaces 206 for communication with other components of the network 100.

The processor 202 is configured to obtain two or more signals strength measurements taken by the same mobile terminal 104 at substantially the same time in a data set that associates, for each of two or more different radio resources of a given radio resource type, a measured signals strength with an identifier of the measured radio resource. The corresponding operations are performed by the processor 202 under control of program code stored in the memory 204. The apparatus 104 is further configured to report the data set to the list generation apparatus 106 (via the one or more interfaces 206 or otherwise).

FIG. 2B shows an embodiment in which the signal strength reporting apparatus 104 is implemented in a modular configuration. As shown in FIG. 2B, the signal strength reporting apparatus 104 comprises an obtaining module 208 configured to obtain two or more signal strength measurements taken by the same mobile terminal at substantially the same time in a data set that associates, for each of two or more different radio resources of a given radio resource type, a measured signal strength with an identifier of the measured radio resource. The reporting module 210 is configured to report the data set to the central list generation apparatus 106. The central list generation apparatus 106 will typically receive such data sets from multiple signal strengths reporting apparatus 104 distributed in separate radio access network domains 100A of the network 100.

Figure 3B:
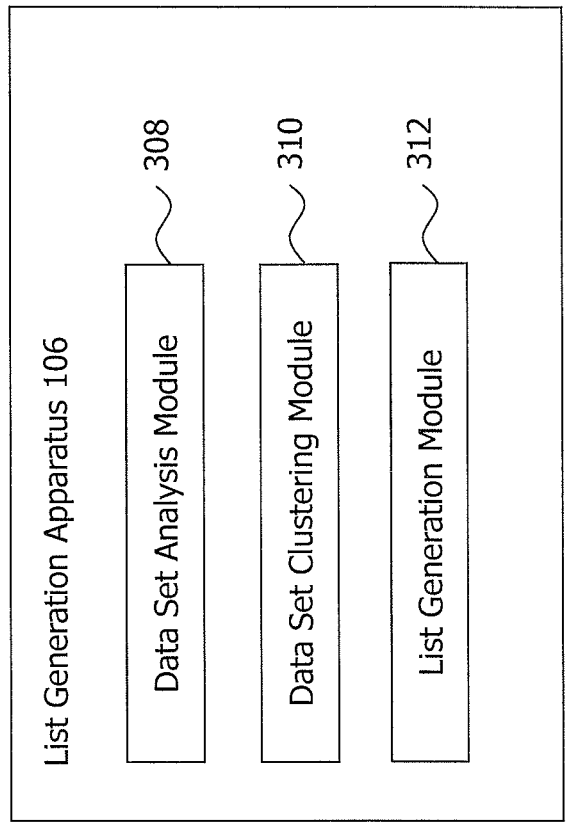
FIGS. 3A and 3B illustrate embodiments of a list generation apparatus according to the present disclosure.
Figure 3A:
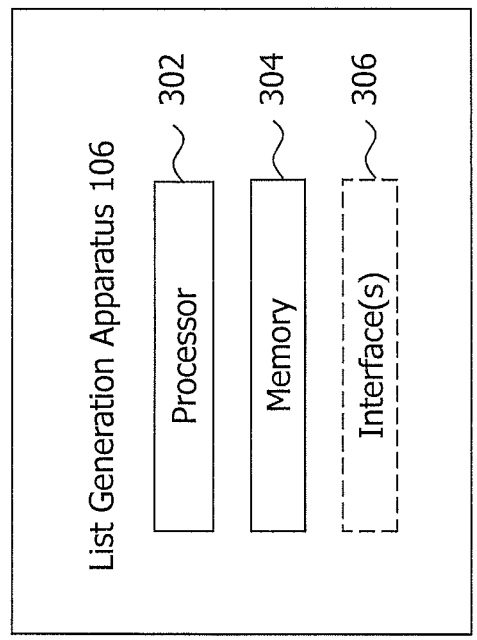

FIGS. 3A and 3B show two embodiments of the list generation apparatus 106. With reference to the embodiment shown in FIG. 3A, the list generation apparatus 106 comprises a processor 302 and a memory 304 coupled to the processor 302. Optionally, the list generation apparatus 106 comprises one or more interfaces 306 for communication with other components of the network 100.

The processor 302 is configured to analyze, using a similarity metric, similarity of plurality of data sets received from one or more signal strength reporting apparatuses 104. The processor 302 is further configured to cluster the data sets, or information derived therefrom, based on data set similarity so as to obtain multiple clusters representative of different radio locations. Further, the processor 302 is configured to determine, from each cluster, a radio resource set that defines a list of neighbouring radio resources for the radio location represented by that cluster. These operations are performed by the processor 302 under control of program code stored in the memory 304.

The list generation apparatus 106 can also be implemented in a modular configuration as illustrated in FIG. 3B. In this modular configuration, the analysis, clustering and determination operations as described above with reference to the processor 302 are implemented by a data set analyses module 308, a data set clustering 310 and a list generation module 312, respectively.

Figure 4B:
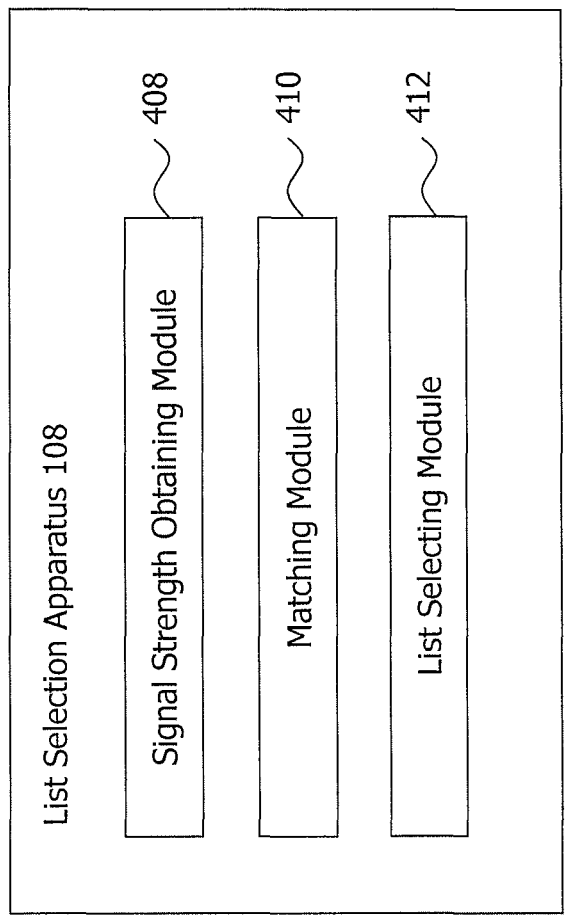
FIGS. 4A and 4B illustrate embodiments of a list selection apparatus according to the present disclosure.
Figure 4A:
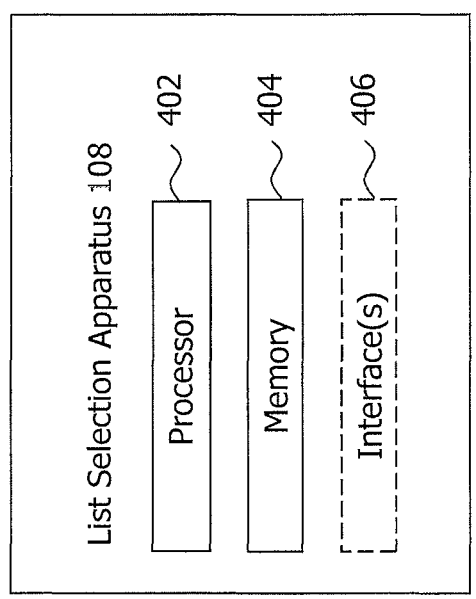

FIGS. 4A and 4B illustrate two embodiments of the list selection apparatus 108. With reference to the embodiment illustrated in FIG. 4A, the list selection apparatus 108 comprises a processor 402 and a memory of 404 coupled to the processor 402. The list selection apparatus 108 optionally comprises one or more interfaces 206 for communication with other components of the network 100.

The processor 402 is configured to obtain at least one signals strength measured by one of the mobile terminals 104 for at least one radio resource. The processor 402 is also configured to match the at least one obtained signals strength and an identifier of the at least one measured radio resource with a plurality of clusters generated by the list generation apparatus 106 to determine a matching cluster. The processor 402 is further configured to select a list of neighbouring radio resources that is associated with the matching cluster. These operations are performed by the processor 402 under control of program code stored in the memory 404.

Referring to the modular configuration of the list selection apparatus 108 illustrated in FIG. 4B, the obtaining, matching and selecting operations as described above with reference to the processor 402 are implemented by a signal strength obtaining module 408, a matching module 410 and a list selecting module 412, respectively.

Figure 5A:
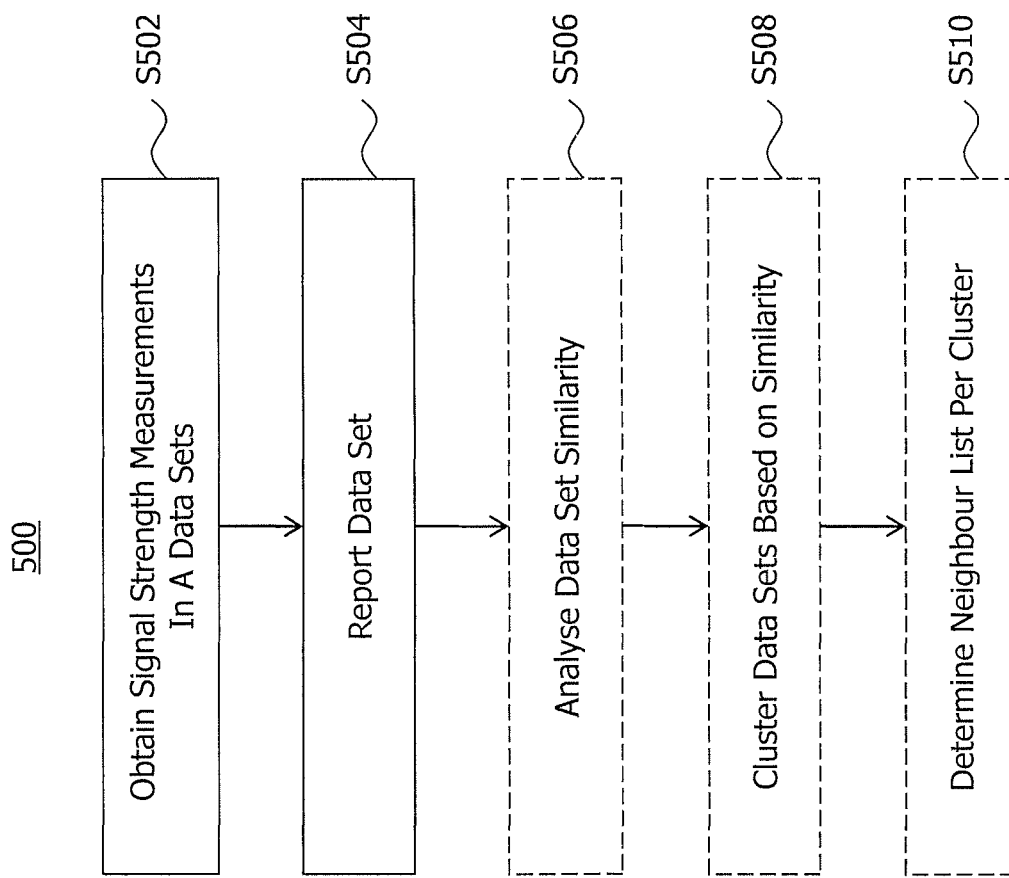
FIGS. 5A and 5B illustrate two method embodiments of the present disclosure.
Figure 5B:
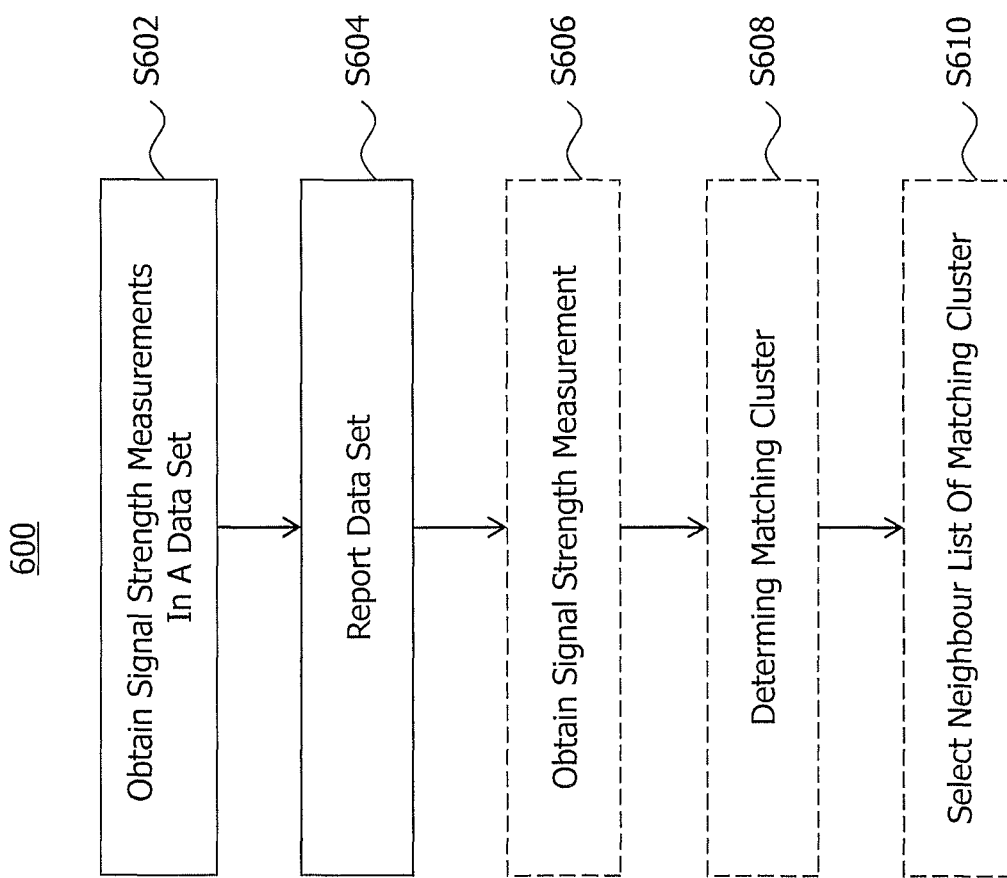

In the following, two method embodiments for processing signal strength measurements within the network 100 illustrated in FIG. 1 will be described with reference to FIGS. 5A and 5B. FIG. 5A illustrates in a flow diagram 500 the operations of and communication between the signal strength reporting apparatus 104 and the list generation apparatus 106. FIG. 5B, on the other hand, illustrates in a flow diagram 600 the operations of and communication between the signal strength reporting apparatus 104 and the list selection apparatus 108. The operations illustrated in FIG. 5A may primarily be performed in a training phase and can be repeated (e.g., in real-time) in an operational phase following the training phase. The operations illustrated in FIG. 5B, on the other hand, can be performed in an operational phase and in real-time.

With reference to the flow diagram 500 of FIG. 5A, the boxes with continuous lines illustrate the steps performed by the signal strength reporting apparatus 104, while the boxes in dashed lines illustrate the steps performed by the list generation apparatus 106. It should be noted that the list generation apparatus 106 is a central apparatus that typically communicates with multiple local signal strength reporting apparatuses 104 in different radio access network domains 100A in the manner illustrated in FIG. 5B so as to prepare multiple lists of neighbouring radio resources, as will now be explained in more detail.

In an initial step S502, the signal strength reporting apparatus 104 obtains two or more signal strength measurements taken by the same mobile terminal 104 at substantially the same time in a data set. The signal strength measurements may be received signal strength (RSS) measurements or RSS-equivalent measurements. These measurements have been performed by a specific one of the mobile terminals 102 at substantially the same time. While the measurements can typically not be performed simultaneously, the time period between the first measurement and the last measurement in a particular data set is at least small enough to ensure that the mobile terminal 102 that performed the measurements has not moved or that any movement of that mobile terminal 102 is small enough to ensure that the measurements in the data set are still representative of a dedicated radio location within the network 100. As an example, the time period can be less than a few seconds or less than a few tenths of a second. In the following, a data set with one or more signal strength measurements will also be denoted as a "radio location fingerprint" or simply "fingerprint".

Each data set obtained in step S502 associates, for each of two or more different radio resources of a given radio resource type, a measured signal strength with an identifier of the measured radio resource. The radio resource type may include radio cell, frequency carrier, frequency band, antenna beam and radio access technology. As such, the radio resource identifier of the radio resource type "cell" will be a cell identifier, and so on. The radio resource identifiers should at least locally be unique within a given radio access network domain 100A or collection of radio access network domains 100A reporting to specific list generation apparatus 106.

In some implementations, the data set logically comprises for each measured signal strength a tuple that associates the measured signal strength with one or more radio resource identifiers. In case of an association with multiple radio resource identifiers, these multiple radio resource identifiers will typically pertain to radio resources of different radio resource types. An exemplary data set may thus comprise for each measured signal strength a tuple such as (RSS; cell identifier) or (RSS; cell identifier; RAT identifier) or (RSS; cell identifier; RAT identifier; frequency carrier identifier). The radio resource identifiers identify the specific combination of radio resources for which the signal strength has been measured by a given mobile terminal 102.

The signal strength measurements may be obtained in a data set in various ways by the signal strength reporting apparatus 104. For example, the signal strength reporting apparatus 104 may receive the data set from the mobile terminal 102 that has performed the measurements. In such a scenario, the grouping of the signal strength measurements to a data set has been performed by the mobile terminal 102. Alternatively, this grouping could also be performed by the signal strength reporting apparatus 104 in case the signal strength measurements (with the associated resource identifier(s)) are individually received from a particular mobile terminal 102 and have been measured at substantially the same time.

In step S504, multiple data sets generated by the same or different mobile terminals 102 are reported by the signal strength reporting apparatus 104 to the list generation apparatus 106. It should be noted that the list generation apparatus 106 will typically additionally receive data sets from other signal strength reporting apparatuses located in the same radio access network domain 100B like the signal strength reporting apparatus 104 or in other radio access network domains. These multiple data sets reported to the list generation apparatus 106 need not necessarily contain the same number of signal strength measurements. Moreover, the individual signal strength measurements reported in the data sets do not necessarily need to relate to the same set of radio resources or radio resource types.

In the following, the operations of the list generation apparatus 106 will be described in response to receipt of a large number of data sets from one or multiple signal strength reporting apparatuses 104. In a training phase, the reported data sets are typically stored by the list generation apparatus 106 until a sufficiently large number of data sets becomes available for clustering the data sets and determining a list of neighbouring radio resources for each cluster, as will now be described in more detail.

Still referring to FIG. 5A, the list generation apparatus 106 in step S506 analyses similarity of the plurality of data sets received from the one or more signal strength reporting apparatuses 104. The analysis is based on a similarity metric that is obtained from a pairwise comparison of the data sets. In more detail, the similarity metric may be configured to permit an evaluation of a similarity of two data sets by comparing signal strengths measured for a coinciding set of two or more radio resource identifiers included in the two data sets and pertaining to the same radio resource type. As an example, the signal strengths in two data sets may be compared if they have matching radio resource identifiers in respective tuples. As a more detailed example, a data set including tuple (RSS1; cell identifier 1; RAT identifier 1) can be compared with a data set including tuple (RSS2; cell identifier 1; RAT identifier 1). The similarity metric may yield a similarity metric value for an individual data set pair. Such a value can, for example, range between a lower border such as 0 (e.g., for no similarity) and an upper border such as 1 (e.g., for identity). As exemplary examples, the similarity metric may be based on any of the following metrics: histogram intersection, Bhattacharyya coefficient, and cosine similarity.

In a further step S508, the data sets as analyzed in step S506, or information derived from these data sets, is clustered based on data set similarity so as to obtain multiple clusters representative of different radio locations. In this regard, the similarity metric derived in step S506 for a plurality of data sets may be used by a clustering algorithm (e.g., one of a K-means algorithm, a K-medoids algorithm and an Affinity Propagation algorithm) for clustering purposes. As such, the clustering algorithm may comprise a similarity metric plug-in for evaluating data set similarity.

As such, each cluster will be formed from a large set of data sets containing similar tuples of measured signal strengths and associated radio resource identifiers, which are characteristic for a specific radio location and, thus, a specific cluster. It should be noted that the data sets in a specific cluster may partially relate to different radio resources, such as different RATs, different frequency carriers, different antenna beams and different frequency bands. As such, each cluster defines neighbourhood relations of, for example, a multi-RAT neighbourhood.

In a further step S510, the list generation apparatus 106 determines, from each cluster, a radio resource set that defines a list of neighbouring radio resources for the radio location represented by that cluster. As an example, the radio resource set that defines a specific list of neighbouring radio resources may include the radio resource identifiers having the highest numbers of occurrences in a given cluster and/or the radio resource identifiers associated with the highest signal strengths in a given cluster.

While steps S502 to S510 will initially be performed in a training phase, the steps may be repeated as new data sets become available from the signal strength reporting apparatus 104 in an operational phase. As such, the clusters and the lists of neighbouring radio resources may be updated during the operational phase.

With reference to the flow diagram 600 of FIG. 5B, the operations of the signal strength reporting apparatus 104 and the list selection apparatus 108 in the operational phase following the training phase will now be described in more detail. The boxes with continuous lines illustrate the steps performed by the signal strength reporting apparatus 104, while the boxes in dashed lines illustrate the steps performed by the list selection apparatus 108. It should be noted that the list selection apparatus 108 is a central apparatus that typically communicates with multiple local signal strength reporting apparatuses 104 in different radio access network domains 100A in the manner illustrated in FIG. 5B.

In certain implementations, the list selection apparatus 108 could also be implemented in the radio access network domain 100A and configured to communicate with the list generation apparatus 106 in the core network domain 100B. In such implementations, the list selection apparatus 108 could be combined with the signal strength reporting apparatus 104 in a single apparatus (e.g., on a network node within the radio access network domain 100A).

It will be assumed in the following that the list selection apparatus 108 has access to the lists of neighbouring radio resources generated by the list generation apparatus 106 as discussed above with reference to FIG. 5A. The operations of the signal strength reporting apparatus 104 and the list selection apparatus 108 will typically be performed in real-time during an operational phase.

In step S602, the signal strength reporting apparatus 104 obtains a single data set comprising one, two or more signal strength measurements taken by the same mobile terminal 102 at substantially the same time, wherein each measured signal strength is associated with an identifier of the one or more measured radio resources as generally explained above with reference to step S502 in FIG. 5A. The obtained data set is then reported in step S604 to the list selection apparatus 108. Step S604 essentially corresponds to step S504 with the difference that the data set is not reported to the list generation apparatus 106 as explained in the context of step S504 but to the list selection apparatus 108 (there will be no difference in this regard if the list generation apparatus 106 and the list selection apparatus 108 are implemented as a single apparatus).

The data sets reported in connection with steps S502 and S504 in the context of list generation may be the same data sets as those reported in the context of steps S602 and S604 for selecting an individual list. In other variants, it may be sufficient if a data set obtained and reported in steps S602 and S604 contains only a single measurement (e.g., a single tuple (RSS; cell identifier)). Multi-RAT and/or multi-carrier fingerprints, for example, are richer in information and, therefore, generally more useful. However, single-RAT and/or single-carrier fingerprints are still usable for data set classification and neighbour list selection.

Now referring to the operation of the list selection apparatus 108, this apparatus 108 receives in step S606 the data set reported in step S604 from the signal strength reporting apparatus 104. In this manner, one or multiple single strengths measured by the mobile terminal 102 for at least one radio resource are obtained by the list selection apparatus 108.

In the next step S608, the list selection apparatus 108 matches at least one obtained signal strength and an identifier of the at least one measured radio resource with the plurality of clustered data sets generated by the list generation apparatus 106 so as to determine a matching cluster. The matching step S608 may be performed using a K Nearest Neighbours (KNN) algorithm.

If a matching cluster can indeed be found in step S608, the list selection apparatus 108 selects the list of neighbouring radio resources that is associated with the matching cluster in step S610. As explained above with reference to step S510 in FIG. 5A, the selected list of neighbouring radio resources will be defined by a radio resource set and will be representative of a specific radio location.

The selected list may be used locally by the list selection apparatus 108 for con-trolling further measurements of the mobile terminal 102 that has reported the data set underlying the selected list of neighbouring radio resources. Alternatively, the selected list of neighbouring radio resources may be transmitted from the list selection apparatus 108 to the signal strength reporting apparatus 104 or to another component of the radio access network domain 100A for configuring a measurement by the mobile terminal 102 that has reported the data set underlying the selected list of neighbouring radio resources.

As an example, a measurement of at least one radio resource included in the selected list of neighbouring radio resources may be triggered. When the radio resource type is cell and the list of neighbouring radio resources is defined by a cell set the characteristic of the current radio location of the mobile terminal 102, the triggered measurement may relate to a cell search based on at least one of the cell identifiers included in the list of neighbouring radio resources. If the mobile terminal 102 has previously been instructed to perform a cell search (e.g., in regard to a specific cell as identified by a cell identifier), a measurement re-configuration for the mobile terminal 102 may be triggered to avoid a cell measurement when there is actually no cell coverage (as determined based on an absence of the cell identifier of the cell to be measured in the selected list of neighbouring radio resources).

In certain implementations, the mobile terminal may currently be utilizing a first radio resource of a given radio resource type (e.g., a first RAT). In this case the measurement may be triggered for a second radio resource of the given radio resource type different from the first radio resource (e.g., a second RAT). In this manner, inter-RAT measurements can be triggered. Of course, in a similar manner inter-frequency carrier, inter-antenna beam or inter-frequency band measurements can be initiated.

The measurements or measurement re-configurations may be triggered using RRC control functions available within the radio access network domain 100A in which the specific mobile terminal 102 is located. Corresponding RRC control functions are, for example, defined in 3GPP TS 36.331 Chapter 5.5 or 3GPP TS 36.133 Chapter 8.1.

By properly triggering or re-configuring measurements on the basis of the list of neighbouring radio resources selected in step S610, the network 100 can eliminate unnecessary measurements, such as unnecessary inter-RAT and inter-frequency carrier measurements. In this manner, radio resources and energy can be saved for the mobile terminals 102 and also some of the Layer 2 control messages can be avoided. As such, the time spent on performing measurements can be reduced, and in certain configurations the number of RATs and/or frequency carriers (or other types of radio resources) which are the subjects of cell searches can be reduced as well. The mobile terminals 102 therefore can faster find and select the optimal radio resources. Also handovers can more safely be performed by the mobile terminals 102. Moreover, the mobile terminals 102 can be instructed in real-time control loops when and what to measure.

The corresponding control interventions enabled by the list of neighbouring radio resources selected in step S610 will be more terminal-specific and radio location-specific than interventions that are purely based on ANR. Cell lists from ANR are valid for an entire coverage territory of a specific cell, whereas the cell list derived in step S610 will typically be more precise than a conventional ANR cell list.

In the following, the operations of the list generation apparatus 106 and of the list selection apparatus 108 will be described in more detail with reference to exemplary use cases and associated data sets ("radio location fingerprints") as received from the signal strength reporting apparatus 104. The user terminals 102 in one measurement configuration periodically perform signal strength (RSS) measurements on a frequency carrier (i.e., a radio resource of a first type) and RAT (i.e., a radio resource of a second type) of a specific radio cell (i.e., a radio resource of a third type) that the mobile terminals 102 are actively connected to. It typically depends on the network side control when such measurements are reported by the mobile terminals 102. The common situation is that the mobile terminals 102 are configured to report signal strength measurements only if certain conditions are fulfilled, such as when an event combining a threshold crossing and a timer expiration happens. Another possibility is that the mobile terminals 102 are instructed to periodically report such measurements. In a similar manner, the mobile terminals 102 can also be instructed to perform inter-RAT and/or inter-frequency carrier measurements.

Figure 6A:
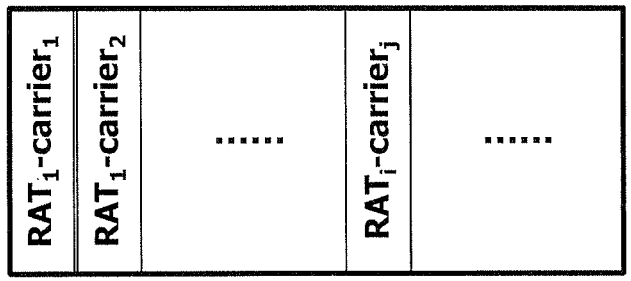

Based on the signal strength measurements in regard to individual radio resources performed by the mobile terminals 102, the mobile terminals 102 themselves or the signal strength reporting apparatus 104 generates data sets as illustrated in FIG. 6A. Multiple such data sets that contain measurements performed at substantially the same time can be combined into a compound data set as illustrated in FIG. 6B.

A single-RAT, single frequency carrier data set is defined to comprise a set of cell identifier-signal strength (RSS) measurement value pairs as illustrated for two individual data sets in FIG. 6A. The data set illustrated in the upper part of FIG. 6A can be interpreted to logically comprise a set of k tuples (RAT identifier 1; frequency carrier identifier 1; cell identifier 1; measured RSS 1) to (RAT identifier 1; frequency carrier identifier 1; cell identifier k; measured RSS k). Such a set of k tuples is typically measured and reported by a particular mobile terminal 102 in one batch. If a specific mobile terminal 102 reports such data sets for several frequency carriers and/or for several RATs (and/or radio resources of any other type) within a short interval of time, then the corresponding individual single-RAT, single-frequency carrier data sets can be concatenated into a compound data set as illustrated in FIG. 6B. As explained above, it is important for a compound data set that the measurements contained therein from a particular mobile terminal 102 in regard to various RATs and/or various frequency carriers happen close enough in time so that the motion of the corresponding mobile terminal 102 is negligible within the corresponding period of time.

The compound data set illustrated in FIG. 6B could be generated by the associated mobile terminal 102, by the signal strength reporting apparatus 104 or any other component located between the mobile terminal 102 and the signal strength reporting apparatus 104 (such as a base station if the signal strength reporting apparatus 104 is not located on a base station).

Figure 7:
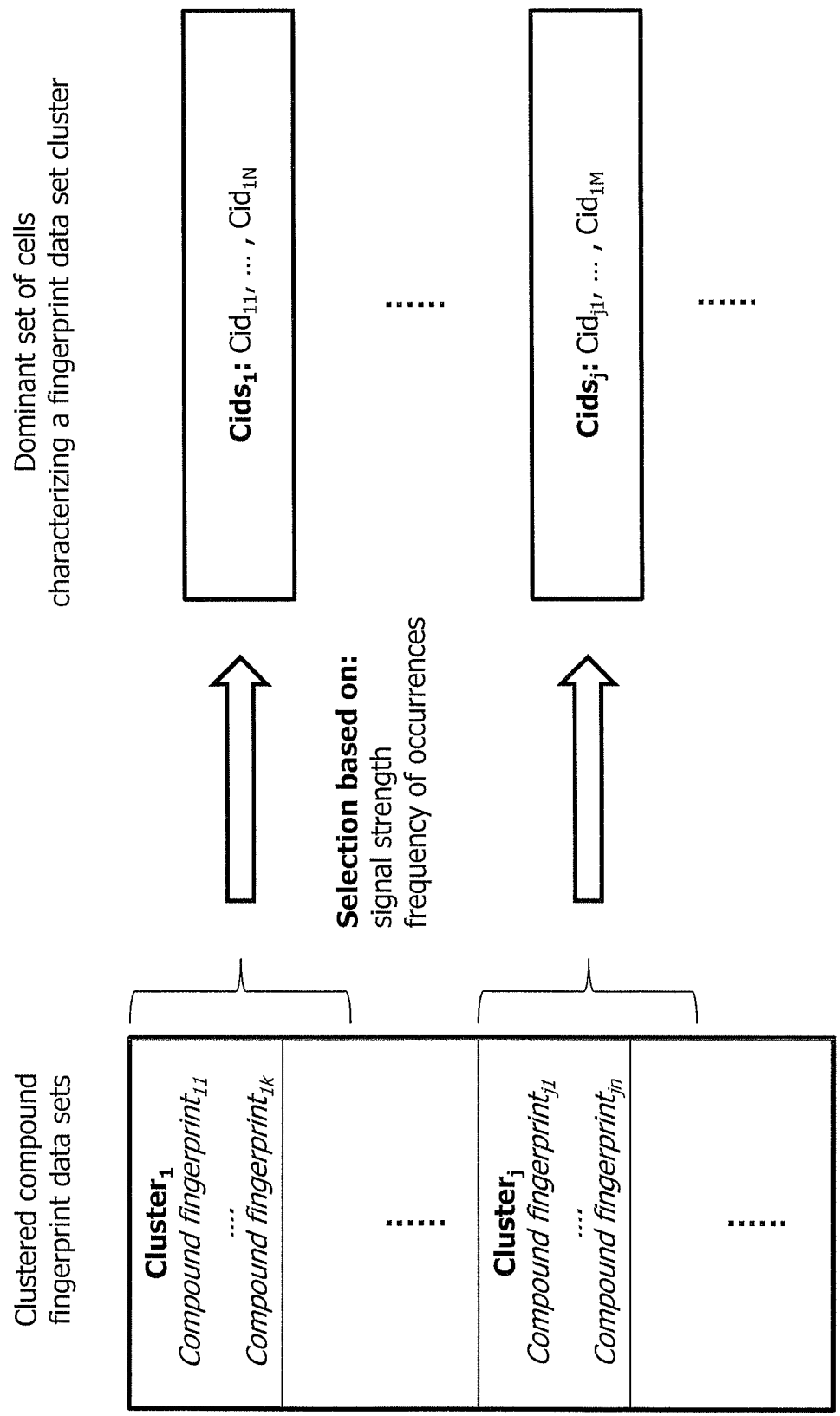
FIG. 7 illustrates an embodiment of determining lists of neighbouring radio resources from data set clusters.

In the following, the operation of the list generation apparatus 106 will be described in more detail in connection with the exemplary data sets illustrated in FIGS. 6A and 6B and with reference to FIG. 7. As shown in FIG. 7, individual compound data sets as shown in FIG. 6B are clustered to multiple data set clusters depending on their pairwise similarity (see steps S506 and S508 in FIG. 5A). For clustering purposes, any one of the K-means, K-medoid and the Affinity Propagations algorithms is suitable.

As more and more incoming data sets are gathered, granularity of the clusters will increase.

In the present use case, the clusters will typically contain single- or multi-frequency carrier, multi-RAT fingerprints that are similar to each other and, therefore, are likely to have been recorded at radio locations close to each other. Then, by filtering the cell identifier-RSS pairs (see FIG. 6A) occurring in the clustered data sets, a set of characteristic cell identifiers can be selected from each cluster. Such a cell identifier set includes the cell identifiers from the RATs and frequency carriers that are likely to have coverage in the neighbourhood of the radio location where the measurements in the cluster originate from. The set of cells characterizing a data set cluster can be representative of the individual cells that have been measured the most often in the individual data sets of the cluster or that have been measured at a high signal strength. In this regard, thresholding decisions may be applied.

It is important to note that the resulting cell set may contain cells from several RATs and frequency carriers. In such a case, the cell set can be used as an inter-RAT, inter-frequency carrier neighbourhood cell list characterizing the associated data set cluster and the radio location where these data sets were recorded.

As a result of the operations schematically illustrated in FIG. 7, for each data set cluster a list of neighbouring radio resources characteristic for the radio location represented by that cluster will thus be obtained (see step S510 in FIG. 5A). It should be noted that while FIG. 7 depicts the determination of cell sets that define lists of neighbouring radio resources, the process described with reference to FIG. 7 could also be performed in regard to other or additional radio resource types.

Figure 8:
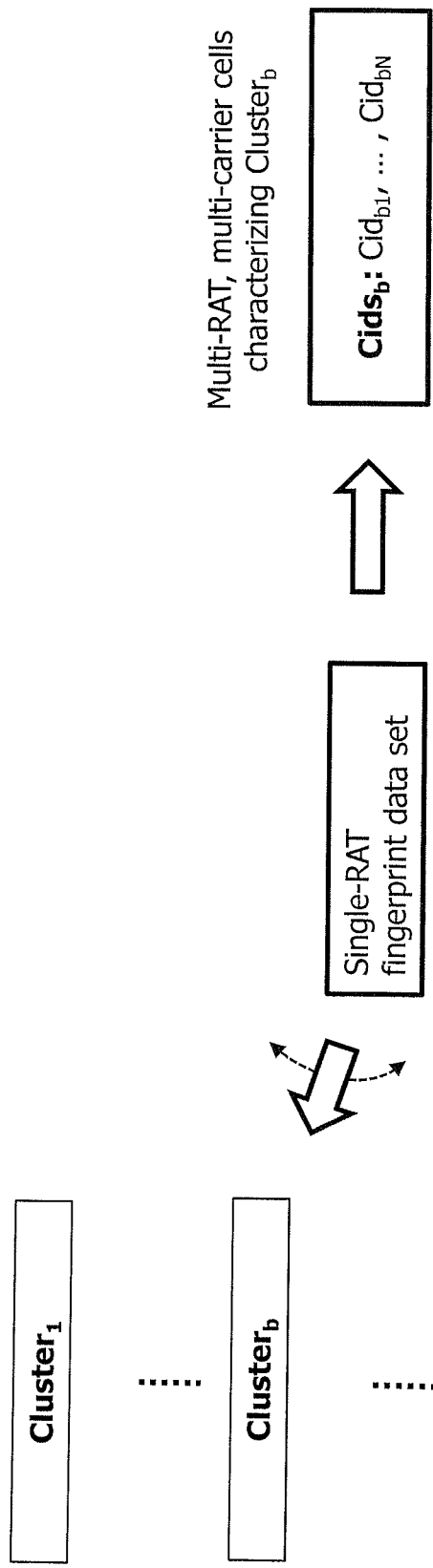
FIG. 8 illustrates an embodiment of selecting a list of neighbouring radio resources based on a data set reported by a mobile terminal.

In the following, the operation of the list selection apparatus 108 will be described in more detail with reference to FIG. 8. FIG. 8 depicts a real-time process that can be performed in the context of the method embodiment illustrated in FIG. 5B or in a different context. The operations illustrated in FIG. 8 start with receipt of a data set recently measured by a particular mobile terminal 102 at the list selection apparatus 108. The data set can be a single RAT, single frequency carrier data set as illustrated for two exemplary data sets in FIG. 6A. The data set may also comprise multiple-RAT and/or multiple-frequency carrier measurements taken substantially at the same time. In general, the data set comprises one or more resource-specific signal strength measurements taken substantially at the same time.

Figure 6A:
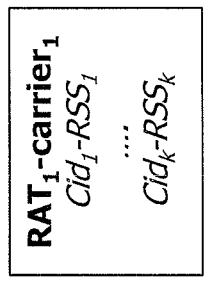
Figure 6A:
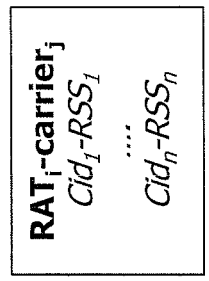

A classifier 802 of the list selection apparatus 108 is configured to compare single-RAT, single-frequency carrier signal strength measurement (or one or more multiple-RAT, multiple-frequency carrier measurements, or generally other radio resource-specific signal strength measurements) received from the particular mobile terminal 102 to the clustered data sets that contain signal strength measurements from the same RAT and the same frequency carrier (this process is also designated as "classification" of the one or more signal strength measurements to be compared). Generally, the same similarity metric may be used for classification as for clustering. The classifier 802 can be implemented in the matching module 410 (see FIG. 4B) and implement step S608 illustrated in FIG. 6. The matching by the classifier 802 can be based on a K Nearest Neighbours algorithm. Additionally, or in the alternative, the matching may be based on a comparison with a cluster medoid previously determined for each cluster to speed up classification. The medoid representing a particular cluster will, for example, contain multiple RATs and multiple frequency carriers.

Once a matching cluster (i.e., a cluster with the best matching data set(s)) has been determined, the associated cell identifier list of the neighbouring radio resources that has been generated previously (see FIG. 7) is selected. If there are cells from several RATs and frequency carriers in that list, then inter-RAT, inter-frequency carrier handovers are possible. It will then be the task of the local RRC control function in the radio access network 100A of the mobile terminal 102 associated with the selected list to instruct that mobile terminal 102 to start or hold any inter-RAT or inter-frequency carrier measurements. A deeper analysis of historical signal strength data and observations on the dynamics of earlier cluster associations is possible to customize a handover policy (e.g., via MRO parameters) for the corresponding mobile terminal 102.

It is additionally possible to utilize the data set input to the classifier 802 in FIG. 8 to update the data set clusters as well as the associated lists of neighbouring radio resources during the operational phase of the list generation apparatus 106.

Figure 9:
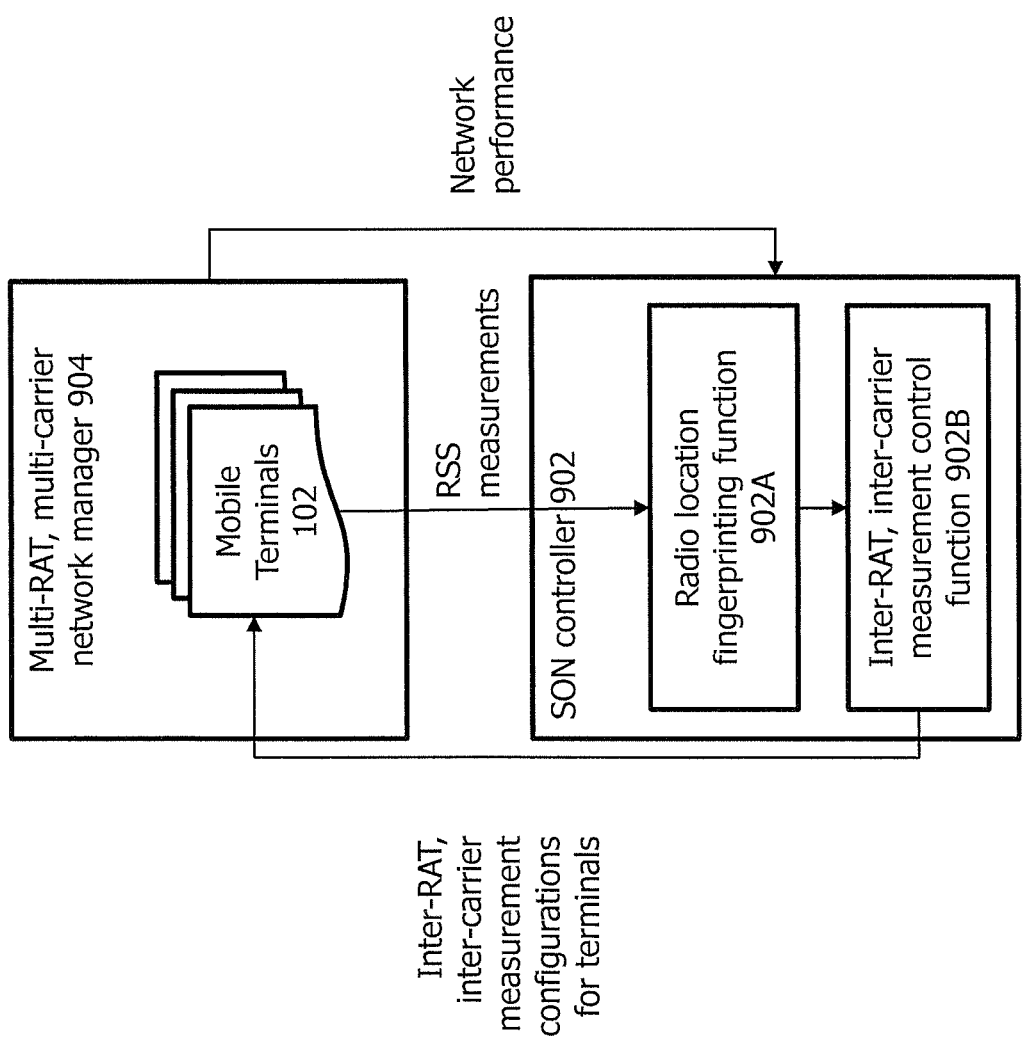
FIG. 9 illustrates another system embodiment of the present disclosure.

FIG. 9 illustrates and summarizes an exemplary implementation of the present disclosure using a self-optimizing network (SON) controller 902 that performs the operations of the list generation apparatus 106 and the list selection apparatus 108 (function 902A) on the one hand and, on the other hand, is in charge of measurement control in regard to the mobile terminals 102 (function 902B). Measurement control specifically instructs the mobile terminals 102 when and what to measure at other frequency carriers and/or RATs than those of the currently serving cell, as also explained in connection with step S510 in FIG. 5A above. Measurement control (function 902B) originally starts on the basis of radio location fingerprinting that is based on historical signal strength measurements, but as radio location fingerprinting is updated in real-time, the timing and target cells of inter-RAT and inter-frequency carrier measurements get closer to optimal. As a result, the handovers will become more accurate besides that fewer and fewer measurements will actually be needed from the mobile terminals 102.

As illustrated in FIG. 9, the SON controller 902 receives the signal strength measurement streams from a common, multi-RAT network manager 904 (such as the signal strength reporting apparatus 104) as samples from terminal reports. The signal strength measurements can be single-RAT, single-frequency carrier signal strength values, which can be augmented with inter-RAT, inter-carrier measurements from non-serving neighbouring cells or network access points occasionally (see FIGS. 6A and 6B).

Radio location fingerprinting function 902A within the SON controller 902 predicts the instantaneously best inter-RAT and/or inter-carrier cells or radio access points as neighbours, which are the potential targets for inter-RAT and/or inter-carrier handovers. As explained above, these neighbours can be derived from the list of neighbouring radio resources generated by the list generation apparatus 106. Based on the best candidates from the list of neighbouring radio resources and, optionally, network performance reports, the measurement control function 902B of the SON controller 902 can instruct the RRC function of the RAT serving a specific mobile terminal 102 from which a recent data set was obtained to instantaneously customize the inter-RAT and/or inter-frequency carrier measurements of that mobile terminal 102.

Figure 10:
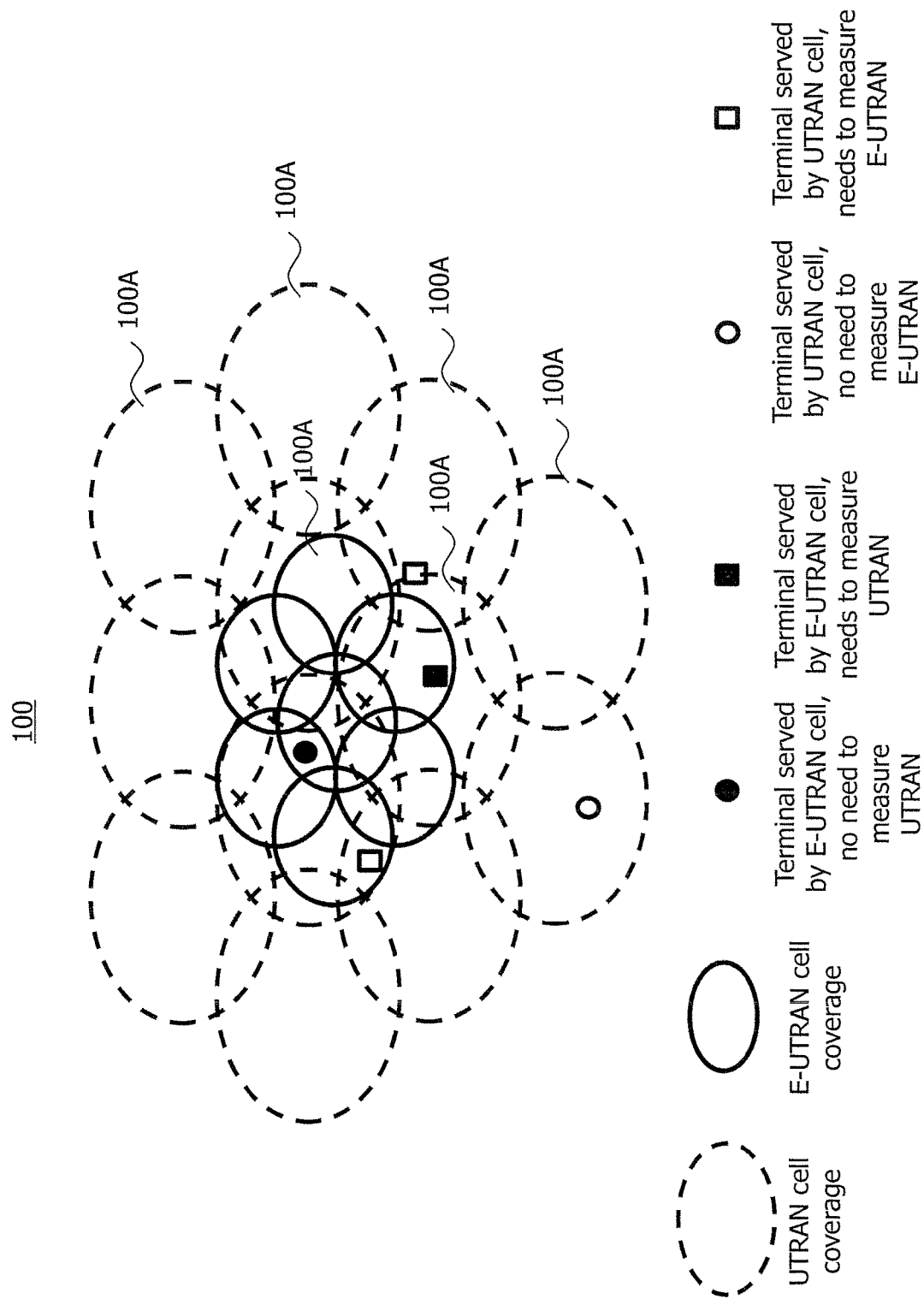
FIG. 10 illustrates a schematic diagram of a multi-RAT network environment in which the present disclosure can be implemented.

FIG. 10 illustrates an exemplary network coverage scenario for a network 100 with multiple radio access network domains 100A in which the present disclosure can be implemented. As an example, it is assumed that the mobile operator provides contiguous UMTS terrestrial radio access network (UTRAN) coverage over a large area and then deploys enhanced UTRAN (E-UTRAN) service only in high-demand islands in a following deployment phase. UTRAN thus constitutes a first RAT, while E-UTRAN constitutes a second RAT different from the first RAT. The operator preference is that wherever E-UTRAN coverage exists, dual-RAT capable mobile terminals should connect to E-UTRAN. In such a scenario, the lists of neighbouring radio resources can be evaluated in regard to the following measurement scenarios (e.g., under control of the measurement control function 902B as illustrated in FIG. 9).

1. When a mobile terminal 102 is connected to UTRAN and far away from the coverage zone of E-UTRAN, then the mobile terminal 102 is instructed to stop inter-RAT measurements.

2. When a mobile terminal 102 is connected to UTRAN and approaching the coverage zone of E-UTRAN, then the mobile terminal 102 is instructed to start inter-RAT measurements on specific E-UTRAN cells which are close-by.

3. When a mobile terminal 102 is connected to e-UTRAN and safely in the coverage zone of E-UTRAN, then it is instructed to stop inter-RAT measurements.

4. When a mobile terminal 120 is connected to E-UTRAN and approaching the edge of E-UTRAN coverage zone, then it is instructed to start inter-RAT measurements on UTRAN cells that are close-by.

Of course, the present disclosure can also be implemented in connection with other heterogeneous network configurations. For example, there may exist a micro-cell which sleeps due to lack of mobile terminals 102 around. Once a mobile terminal 102 is approaching that is attached to a macro-cell and sees other macro-cells but not the sleeping micro-cell, the network side, by recognizing a special constellation of signal strength measurements from the nearby macro-cells in the measurements reported by the mobile terminal 102, deduces that the mobile terminal 102 is nearby the micro-cell. Hence, the micro-cell is activated. Once activation is completed, the mobile terminal 102 will measure the activated macro-cell as well and report the corresponding measurement together with the macro-cell measurements which might still be similar to the earlier measurement reports. As such, a new data set including the newly measured micro-cell can be arranged together with the previous data sets pertaining solely to the macro-cells in the same cluster.

Another example for intra-RAT scenarios is that a WiFi access point can be configured not to answer broadcast queries from mobile terminals 102 (i.e., WiFi clients) unless the query specifically includes the basic service set identification (BSSID) of a particular access point. Based on the radio location determined for a user terminal 102 reporting its signal strength measurements, the network side can inform such user terminals of the BSSID of nearby access points, so that consecutive queries by these user terminals 102 can contain the BSSID.

Moreover, the present disclosure can also be implemented in connection with networks 100 that enable antenna beam-steering towards user terminals 102. In switched-beam systems, each antenna beam will have an identifier (e.g., a dedicated reference symbol in modulation). A specific user terminal 102 may be able to see narrow antenna beams of a serving cell, but may not see the narrow antenna beams of neighbour cells (except that it may see their wider sector beams that are used for broadcasting synchronization signals and system information). Yet, the network side may figure out from the reported signal strength measurements on sector beams that a neighbour cell can provide better connection on a narrow data beam than the current connection on the beam of the serving cell. Accordingly, the lists of neighbouring radio resources may be extended to antenna beams.

A further single RAT, single-frequency carrier use case is the establishment of higher granularity intra-RAT neighbour lists which can be different on one side of the serving cell compared to another side of the serving cell. Some RRC and/or handover mechanisms can take advantage of more precisely knowing the radio location than just knowing the association of a serving cell.

The above measurement strategies can precisely be implemented using the teaching presented herein since the lists of the neighbouring radio resources generated according to the present disclosure are more radio location-specific than, for example, neighbour cell lists that are based purely on ANR (without having to rely on additional positioning methods such as the global positioning system (GPS) or time difference of arrival (TDA)).

Figure 11:
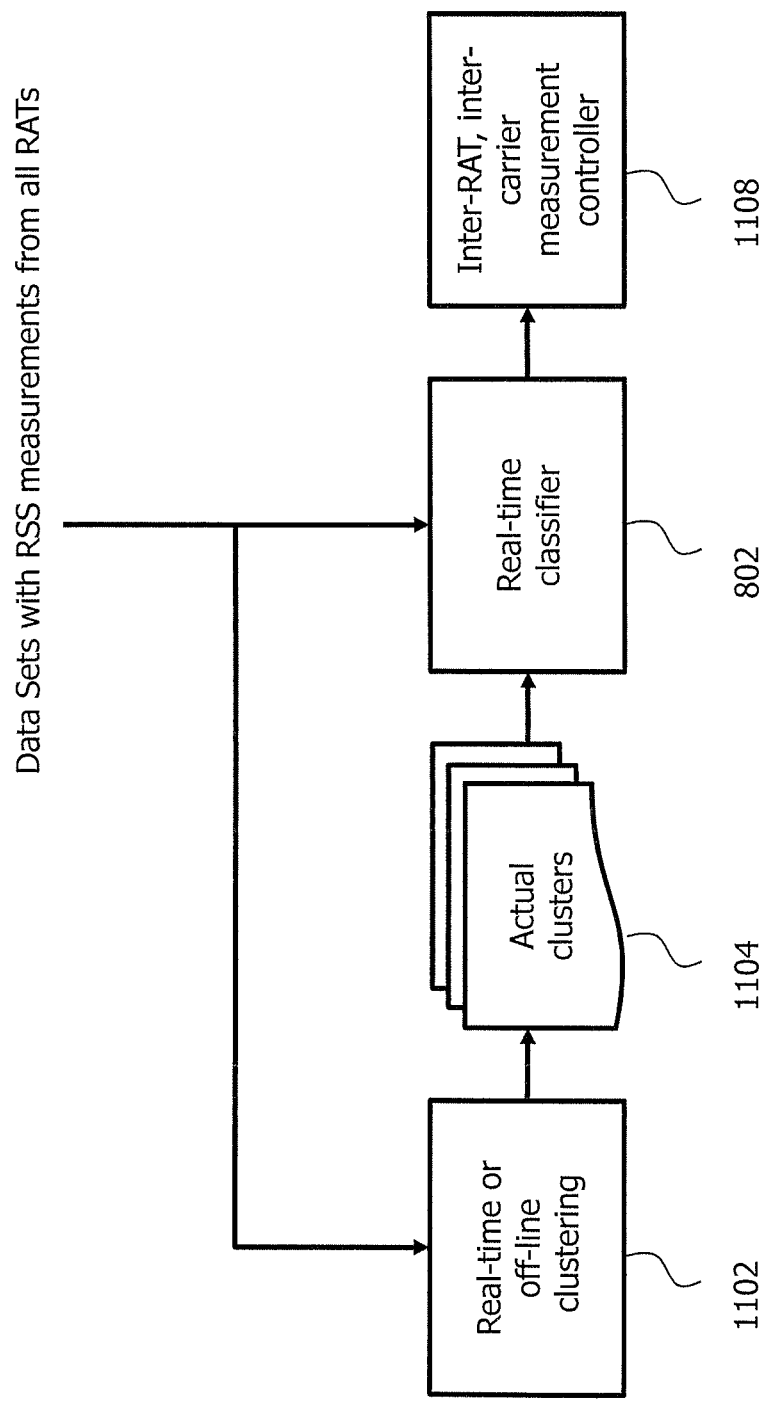
FIG. 11 illustrates an embodiment of a cloud computing implementation of the present disclosure.

FIG. 11 illustrates a computing cloud-based implementation of inter-RAT, inter-frequency carrier measurement control in accordance with the present disclosure. A clustering component 1102 can run (see steps S506 to S510 in FIG. 5A), in a training phase, off-line on a large number of data sets (see FIGS. 6A and 6B) collected at intensive inter-RAT and inter-frequency carrier measurement activity of the mobile terminals 102. This training phase provides an initial set of clusters (see FIG. 7) for the real-time processes (see FIG. 8). Afterwards, the resulting clusters 1104 can be updated in real-time as data sets with new signal strength measurements are obtained from the mobile terminals 102. There exist hierarchical clustering algorithms for streaming data capable of coping with the rate of incoming signal strength measurements, but processing delays are generally tolerable as long as the existing clusters 1104 correctly represent radio locations with multi-RAT and/or multi-carrier (and, optionally, one or both of multi-antenna beam and multi-frequency band) coverage.

The clustering processing can be split and parallelized on a territorial basis. Moreover, in regard to hierarchical clustering, the cluster centers or medoid data sets of the clusters 1104 can be re-clustered into a few high-level clusters once some initial clusters have been formed from the data sets. As such, each data set belongs to an initial cluster, which then further belongs to a high-level cluster. The entire coverage area as well as the data sets are then sorted into subsets based on their associations to a high-level cluster. The data set subsets then can be separately and in parallel re-clustered into fine-grained smaller clusters. The parallel, second round clustering processes can be followed again by the re-clustering of the cluster centers or medoids, followed by the re-sorting of the data sets in regard to the newly established high-level clusters. In the meantime, the incoming flow of data sets can be rendered to the existing fine-grained clusters and can replace older data sets. As such, the population of data sets taking part in the distributed clustering can be kept under control.

The hierarchical or non-hierarchical clusters 1104 are used as a basis for operating the real-time classifier 802. The real-time classifier 802 also directly receives the latest set of data sets, as shown in FIG. 11. The clusters 1104 do not come to an enormous amount of data, so they can be easily replicated for or shared by multiple instances of the real-time classifier 802. The number of classifier instances can be adjusted to the incoming rate of data sets (i.e., the incoming rate of signal strength measurements, see, for example, FIG. 6A). If the basic fingerprinting functionality (without the above-mentioned MRO) is implemented, then there is no need for time-sequential tracking of mobile terminals 102. Hence, the classifier instances are stateless, and simple load balancing among the instances is sufficient.

The parallel clustering processes and the load-balanced real-time classifier instances can run in a virtualized cloud computing environment. The classifier instances may share the actual clusters 1104 but, as said, the shared data amount is not large and can easily be replicated.

The measurement controller 1108, which corresponds to the measurement control function 902B of FIG. 9, is closely tied to the RRC functions of the individual RATs as explained above. In some variants, the measurement controller 1108 can be implemented as an extra functionality of RRC (i.e., in a distributed, local manner within each of multiple radio access network domains 100A).

As has become apparent from the above description of exemplary embodiments, the technique presented herein minimizes the amount of measurements (e.g., inter-RAT or inter-frequency carrier measurements) that mobile terminals 102 need to perform in order to explore their radio environment. As such, the present technique permits to find the best connection in a heterogeneous network 100 providing multi-RAT and multi-frequency carrier support (as shown, for example, in FIG. 10). In accordance with the principles presented herein, the mobile terminals 102 can be instructed when and what radio resources (e.g., RATs, frequency carriers, cells, and so on) they need to measure, and also when mobile terminals 102 can hold or avoid such measurements.

Also, the technique presented herein permits to localize mobile terminals 102 more precisely, which need not necessarily be the actual physical location but rather is a radio location in the radio fields of cells or wireless access points supporting, for example, different RATs and different frequency carriers. This radio localization allows an instantaneous customization of, for example, a multi-RAT and/or multi-frequency carrier neighbourhood cell list for each mobile terminal 102. The resulting list of neighbouring radio resources can then be used to configure (e.g., via RRC) how mobile terminals 102 need to conduct their measurements, in particular inter-RAT and/or inter-frequency carrier measurements.

The invention claimed is:

1. An apparatus for determining a list of neighbouring radio resources from signal strength measurements taken by mobile terminals, wherein two or more signal strength measurements taken by the same mobile terminal at substantially the same time are grouped to a data set that associates, for each of two or more different radio resources of a given radio resource type, a measured signal strength with an identifier of the measured radio resource, the apparatus being configured to:
   analyze, using a similarity metric, similarity of a plurality of data sets;
   cluster the data sets, or information derived therefrom, based on the data set similarity to obtain multiple clusters representative of different radio locations; and
   determine, from each cluster, a radio resource set that defines the list of neighbouring radio resources for the radio location represented by that cluster.

2. The apparatus of claim 1, wherein the radio resource type includes at least one of radio cell, frequency carrier, frequency band, antenna beam, and radio access technology.

3. The apparatus of claim 1, wherein the radio resource type is cell and wherein the radio resource set is a cell set.

4. The apparatus of claim 3, wherein at least one additional radio resource type is at least one of frequency carrier, frequency band, antenna beam and radio access technology, and wherein at least some of the data sets associate a measured signal strength with an identifier of the measured cell and an identifier of the at least one additional measured radio resource of the at least one additional radio resource type.

5. The apparatus of claim 4, wherein the list of neighbouring radio resources comprises the cell identifiers of the cells included in the cell set and the associated radio resource identifiers for the at least one additional radio resource type.

6. The apparatus of claim 1, configured to:
   determine, for a given cluster, the radio resource set based on at least one of:
      a number of occurrences of an individual radio resource identifier in that cluster; and
      measured signal strengths associated with the radio resource identifiers in that cluster.

7. The apparatus of claim 1, wherein the similarity metric is configured to evaluate similarity of two data sets by comparing signal strengths measured for a coinciding set of two or more radio resource identifiers included in each data set and pertaining to the same radio resource type.

8. The apparatus of claim 1, configured to:
   initially perform the analysis, clustering and determining operations in a training phase; and update the clusters as new data sets are obtained in real time during an operational phase following the training phase.

9. A method for determining a list of neighbouring radio resources from signal strength measurements taken by mobile terminals, wherein two or more signal strength measurements taken by the same mobile terminal at substantially the same time are grouped to a data set that associates, for each of two or more different radio resources of a given radio resource type, a measured signal strength with an identifier of the measured radio resource, the method comprising:

analyzing, using a similarity metric, similarity of a plurality of data sets;

clustering the data sets, or information derived therefrom, based on the data set similarity to obtain multiple clusters representative of different radio locations; and determining, from each cluster, a radio resource set that defines the list of neighbouring radio resources for the radio location represented by that cluster.

* * * * *